Patented June 30, 1931

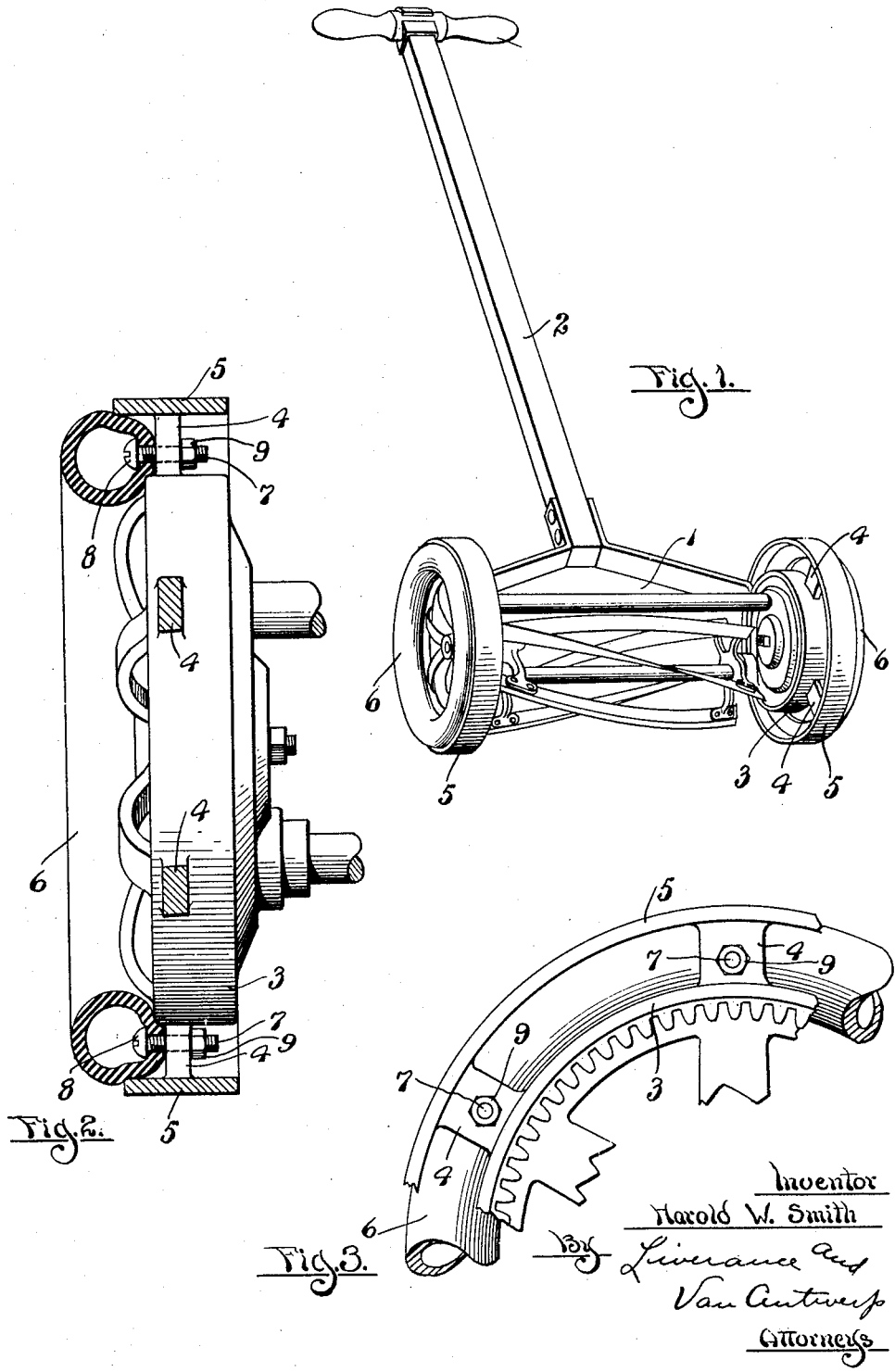

1,812,499

UNITED STATES PATENT OFFICE

HAROLD WHEELER SMITH, OF UTICA, NEW YORK, ASSIGNOR OF ONE-HALF TO WILLIAM A. AINSWORTH

GUARD FOR LAWN MOWER WHEELS

Application filed November 5, 1929. Serial No. 404,905.

This invention relates to a simple and effective guard for lawn mower wheels, whereby the wheels striking against objects will not deface or otherwise harm the same. This is particularly useful in cemeteries where the monuments are frequently struck by the wheels of a lawn mower and the monument defaced, especially at the corners where pieces may be chipped or broken away. It is a primary object and purpose of the present invention to provide a simple and easily applied guard to the lawn mower wheels whereby any danger of damage from the wheels coming in contact with objects is completely avoided. An understanding of the invention may be had from the following description taken in connection with the accompanying drawings, in which, Fig. 1 is a perspective view of a lawn mower equipped with my invention.

Fig. 2 is an enlarged vertical section through a lawn mower wheel equipped with my invention, and Fig. 3 is a fragmentary enlarged side elevation of a lawn mower wheel equipped with my invention.

Like reference characters refer to like parts in the different figures of the drawings.

The lawn mower 1 is of a conventional construction having the usual tongue 2 with handles at its outer end and wheels which carry the lawn mower over the ground. As shown the wheels include inner drums 3 from which connecting lugs or spokes 4 extend outwardly to integrally connect the outer rim 5 of the wheels with the drum 3. The details of construction of the lawn mower itself form no part of this invention and need not be entered into herein.

With my invention rubber hose 6 of proper length to form a complete circle when placed within the inner side of the outer rim 5 of a wheel is provided and a plurality of threaded bolts 7 of the stove bolt type are inserted through a side of the hose in spaced apart relation to each other so that the heads 8 of the bolts come against the inner side of the hose as best shown in Fig. 2. These bolts are spaced at the proper distances so that they will come opposite the lugs or spokes 4 described, through which openings are made to pass the bolts. Nuts 9 are threaded on the bolts after passing through the parts 4.

When attached in the manner described the hose, formed into a circular form, is drawn snugly into place against the series of lugs or spokes 4 and projects outwardly a distance beyond the outer edges of the rim 5 of the wheel to which it is attached so that the outer edge of said wheel is kept from striking against objects which may extend above the surface which is being mowed by the lawn mower. In a cemetery the protective ring supplied by the hose thus connected is what strikes against the monument and of course the lawns are protected as to their shrubbery in the same manner. At the same time the hose does not touch the ground and is therefore not subject to wear by working against the ground.

This construction described has been used and has proved very practical in service. The cost is slight. The guard is very quickly and easily applied and when once attached is not liable to come loose but on the other hand remains securely and firmly in place. The invention is defined in the appended claims and is to be considered comprehensive of all forms of structure coming within their scope.

I claim:

1. A lawn mower having wheels to run over the ground, and a yieldable hollow protective guard attached at the outer side of each of said wheels near its outer periphery and extending beyond the outer edges thereof.

2. In a lawn mower having wheels to run over the ground, a length of hollow rubber hose bent into circular form and located against each wheel at its outer side, and means for securely attaching said hose to said wheel.

3. A lawn mower having wheels, each including a drum, a plurality of outwardly extending spokes on said drum and a surrounding rim of metal attached to the outer end of the spokes, a circular guard of yieldable material located against said spokes, and within said outer rim and projecting beyond the outer edges of said rim, and means for securing the guard to said spokes.

4. A lawn mower having wheels and a protecting rubber guard for each wheel comprising, a length of yieldable material circular in cross section formed into a circle having an outer diameter less than the outer diameter of the wheel and located against the outer side of the wheel, and means for securing said guard to the wheel, said guard extending outwardly beyond the outer edge of the rim of said wheel.

5. A lawn mower wheel including a central drum, a plurality of spaced apart short spokes extending radially outward from the drum, a surrounding rim of metal connected to the outer end of the spokes, the outer edges of said rim being located in a plane outside of the plane of the outer side of the drum, and a guard comprising a length of rubber hose formed into circular form and lying against the spokes at the outer sides thereof and within the rim of the wheel, and a plurality of bolts having heads located within the hose and having shanks extending through said spokes, and nuts on the ends of the bolts to draw the hose securely to the outer sides of said spokes.

In testimony whereof I affix my signature.

HAROLD WHEELER SMITH.